May 22, 1956 — T. C. DUVALL — 2,746,895
MANUFACTURE OF FIBER FELTS
Filed June 19, 1951

Inventor
Thure C. Duvall
by W. Bartlett Jones,
Attorney

United States Patent Office 2,746,895
Patented May 22, 1956

2,746,895

MANUFACTURE OF FIBER FELTS

Thure C. Duvall, Cloquet, Minn., assignor to Wood Conversion Company, St. Paul, Minn., a corporation of Delaware Application June 19, 1951, Serial No. 232,405

11 Claims. (Cl. 154—101)

The present invention relates to forming integrally felted air-laid bonded fiber mats or cushions, having one or more of characteristic layers therein, and in particular to an absorbent mat having an interfacial partitioning layer as a block or retardant for transmission of absorbed liquid across it.

The present invention arises from consideration of the fact that low density fiber felts of absorptive capacity for aqueous liquids present a high degree of collapse under light pressure as a result of having absorbed aqueous liquid. Where the felt is used for cushioning value as well as for absorptive capacity, the collapse is undesirable. Many common uses present such felts to conditions such that exposure to liquid is limited to one face. In a mat of homogeneous character, absorption results in distribution of liquid throughout the mat with the danger of collapse likewise distributed from face to face.

The present invention provides for a variety of products and in particular for the formation of an integrally felted air-laid fiber mat having absorbing quality at each face, and with an intermediate interfacial partition limiting or blocking the transfer of liquid absorbed by one face to the portion of the mat on the other side of the partition.

However, in producing such a mat it has been found that the method and apparatus suitable to that specific end, are capable of use with a variety of materials and with modifications to make non-homogeneous fiber mats of a wide variety as to structure and component materials, yet all qualified as integrally felted air-laid fiber mats.

By the term "integrally felted" it is meant that the fibers are felted continuously from face to face of the mat without a cleavage plane as would result from bonding two faces of two separately felted mats.

Air-laid felt is commonly characterized as the product of initially depositing from air suspension a low-density mat of one layer substantially uniformly felted or several low-density layers of different character, and then compressing to densify each low-density layer thereof and thereby to increase the degree of felting in such layer and to effect or to increase felting at each interface between layers. Such a product has a structure different in kind from a felt of the same fibers, of the same density, and of adjacent layers bonded together after the fibers of each layer are bonded to each other.

The general object of the invention is to form an integrally felted air-laid felt having two or more regions of different properties.

It is an object of the invention to air-lay fibers as a low-density felt and to treat a region of the resulting felt in a characteristic way to predetermine the ultimate properties of that region of the final felt, the treatment being carried out before the fibers are bound one to another and before the resulting unbonded felt is finally compressed in advance of bonding the fibers to each other.

It is a particular object of the invention to form such a bonded felt having two face layers which are absorptive of aqueous liquid, and an internal partitioning layer which is repellant to such liquid.

Various other and ancillary objects and advantages of the invention will become apparent from the following description and explanation of the invention as set forth with respect to the accompanying drawings, in which.

Figure 1:
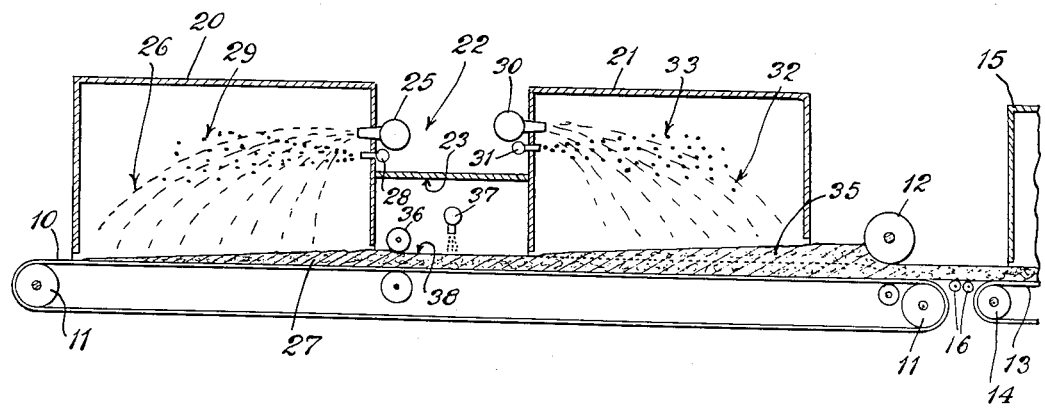
Fig. 1 represents a two-chamber process in which a first-formed mat portion is treated, then built upon to complete the full mat.

The invention relates to bonded air-laid felts in the formation of which there is one or more compression steps increasing the density and the degree of felting of each of two or more low-density layers thereof having fibers mobile therein and feltable across interfaces between such layers, which felting is then substantially fixed by bonding fiber to fiber. Bonding may be effected by activating to adhesiveness a bonding agent carried thereby, as for example, powders or coatings of pitch, resins or thermosetting synthetic resinous materials; or in another well-known way by drying out a liquid containing adhesive material, which is carried by the fibers, such as a liquid dispersion of starch, protein, dextrin, or resinous substance, such as thermosetting resin-forming phenol-formaldehyde condensation products readily dispersible in a liquid vehicle, preferably aqueous.

In the manufacture of air-laid felts by gravity deposition, fibers suspended in gas (hereinafter referred to as air) are allowed to fall in a manner to build up a felt. This is commonly done in a continuous process and the mat formed gradually builds up on a moving conveyer in the bottom of a settling chamber. Deposition by gravity results in such a light impact in the landing of a fiber on those fibers already deposited that the pile is of very low density, in the nature of about ½ pound per cubic foot (dry basis) in the case of fibers derived from wood even when the fibers carry a moistening quantity of liquid adhesive. The density is less when the fibers are dry and are intermingled with a solid fusible bonding material in finely divided form. In each case, the fibers lie more in the relation of one upon another as contrasted to being interfelted. The impact of striking may be increased, as by pneumatically or otherwise forcefully projecting the individual fibers upon the mat being formed. It is well known that the greater the impact of striking, the higher the degree of felting in the resulting mat.

The present invention relates to air-laid bonded mats formed by depositing individual fibers from gaseous suspension with such a low degree of felting that the mat and each different layer thereof must be thereafter compressed to effect an increase in felting for its ultimate utility, before the bonding agent has been activated or set to fix the degree of felting so attained. In the case of gravity felting, the degree of densification by compression is considerable in order to provide a bonded mat having an appreciable strength, deriving from interfelting and from fiber-to-fiber bonding in such felted condition.

The present invention contemplates the use of fibers and a bonding agent such as to form a bonded mat having continuous felting from face to face but different properties layer-wise, effected by use of an additive in the initial deposition of the mat. More specifically, a facial portion of the mat of mobile and feltable fibers already deposited and yet to be compressed to a greater density, is subjected to the receipt of an additive or agent for imparting a specialized property, such as waterproofness or water resistance or repellancy in the final dry bonded mat. Said agent may be in the form of a liquid, semi-solid, or solid suitably applied, and preferably in finely divided particle form directed onto the temporary face of said initially deposited portion of the mat. Thus, a completely deposited mat requiring compression, may consist, for example, from face to face of a layer of one kind of fibers carrying or associated with a bonding agent, a layer of fibers carrying the additive along with associated bonding material, and a layer of the first kind or other kind of fibers carrying or associated with the bonding agent.

It is to be understood that both the bonding agent and the fibers at the two faces need not be the same, but when they are the same the invention may be more easily carried out in well-known apparatus as will be explained. When the fibers are different in different layers, the apparatus may be more complicated to effect such a multilayer fiber formation.

The preferred manner of carrying out the process to form a preferred symmetrical product is to form a low-density deposited unbonded half-mat of absorbent fiber, with or without some compression short of some predetermined final compression, then to apply to the temporary face of the half-mat the desired treating agent, then to form thereon a like and complementary low-density unbonded half-mat of structure generally symmetrical to the first half-mat with reference to the treated face as the plane of symmetry for the ultimate whole mat. Then the whole mat is compressed and bonded in any of the conventional ways consistent with activating the treating agent for its intended function, which means heating and drying the mat where the agent is a wax emulsion, for example. Thereby the two faces are of equal quality and either face may be exposed for absorption. Thus, to the degree that the treatment at the center is carried out, absorption at only one face may be more limited to that side of the treated layer with any subsequent collapse, and with retention of a cushioning quality on the opposite side of the treated layer as a result of retarded or blocked transmission of absorbed liquid across the partition.

For the described symmetrical product, it is preferred for some uses to have a water-resistant layer function as a block against transfer of absorbed liquid at one face across the partition to the other face. This is important in using such mats as catamenial pads. Accordingly, the process and product are herein illustrated in detail by reference to making such a useful material with the understanding that the invention is not so limited, and that there are modifications and departures, some of which are indicated hereinafter.

In Fig. 1 there is shown an endless conveyer 10, preferably in the form of an endless wire screen running over end rolls 11, on which conveyer fibers are initially deposited as a mat and then compressed as by roll 12. When the fibers bear liquid adhesive, the mat may be transferred to a second endless conveyer 13 running over end roll 14 for travel through an oven 15 in which the heat dries and sets the adhesive as a bond. Numeral 16 represents a suitable transfer device for lifting the fragile mat in its unbonded condition from the forming conveyer 10 to the oven conveyer 13, a suitable transfer device being described in Heino U. S. Patent No. 2,493,194.

The conveyer 10 is shown as traveling through the bottom of two depositing chambers 20 and 21 and through an open space 22 between said two chambers, across which space there is a raised platform 23 for equipment and the stationing of an operator to control such equipment for the two chambers 20 and 21.

Each chamber operates in a conventional way, for example, that illustrated in said Heino patent. The chamber 20, for instance, has a nozzle or a bank thereof designated 25 suitably provided with an air suspension of dry absorbent fibers, preferably sulfite cellulose fibers from wood, which are discharged into the chamber in a spreading stream indicated at 26 in a direction opposed to the direction of the moving conveyer 10, on which the falling fibers build up a deposit designated 27. As the fibers are dispersed in chamber 20, they are subjected to association with a bonding agent, preferably in the form of a spray of adhesive-containing liquid. The liquid adhesive material becomes associated with the fibers as they are suspended in the chamber so that the bulk of the fibers forming the deposit 27 are wet with adhesive before they land. Numeral 28 indicates a spray nozzle or a bank thereof, and numeral 29 represents the spreading stream of adhesive-bearing particles, some of which may gravitate free from contact with fiber to the top of the mat 27 at any portion of the chamber, so as to be embodied largely within the mat.

As set forth in the said Heino patent, the mat 27 formed in the chamber 20 may be compressed and dried. However, because of some fractionation of the normal mixture of fibers into various sizes within the chamber, the fiber size and formation may be somewhat different at the two faces of the mat 27 formed in chamber 20. Accordingly, when the mat 27 is used as a half-mat, and a like half-mat in reverse facial relation is formed on top of it, the whole-mat is substantially the same in its two facial qualities as to fiber-size and formation.

To accomplish this the forming chamber 21 substantially duplicates the forming chamber 20 in construction and operation, but it operates in the reverse direction. This permits its respective fiber and adhesive nozzles 30 and 31, and their respective streams 32 and 33, to be under control of a single operator on platform 23 along with like control of the operations for chamber 20. Thus, there is formed in chamber 21 a reverse half-mat 35 on top of half-mat 27. Without compression of half-mat 27 before depositing thereon the half-mat 35, the uncompressed whole-mat from top to bottom consists primarily of adhesive-bearing fibers substantially unfelted and piled one upon the other, yet sufficiently separated and relatively mobile so that upon compression the fibers become integrally felted from top to bottom of the compressed mat.

Where fibers are deposited over a large area by gravity as described, the top surface of the mat is not level, but characterized by lumps or hills of fluff. Rather than treating this irregular surface, it is preferred to level it toward or to a planar area for the treatment to be given. This may be effected by horizontally moving the material, but preferably by slight compression to effect a planar surface.

In the space 22 between the two forming chambers, the half-mat 27 is exposed for any desired treatment to provide the desired partition. While it is a simple matter to lay upon the half-mat 27 a partitioning membrane, this will break the desired integration of felting from face to face in the whole-mat. Accordingly, the fibers per se are treated to alter the surface character without loss of the ability to participate in the integral felting desired. Preferably, they are subjected to receipt of a partitioning agent designed to render the fibers less hydrophilic, and preferably hydrophobic, with respect to the adjacent untreated fibers. The treating agent may be liquid, semi-solid or solid, but preferably it is a liquid in order to facilitate injection and deposition of it as a fine spray. It may be a melted wax or like material, or it may be an emulsion or other dispersion of wax or similar agent which in the ultimate mat will cause the fibers to have the desired deficiency in absorptive quality compared to the adjacent untreated fibers.

The numeral 36 illustrates a leveling roll acting upon the surface with slight compression to effect a nearly planar area for treatment. Numeral 37 indicates a bank of devices, which in the case of liquid are spray nozzles to direct the desired agent onto the top face 38 of the unbonded half-mat 27 leaving roll 36. These may be operated from below the platform 23, and be controlled from the platform by the operator mentioned.

The invention is not limited to the specific arrangement of Fig. 1, nor is the operation of the apparatus shown in Fig. 1 limited to placing the treated zone near the center of the mat. By using more or less of fiber in one chamber than in the other of Fig. 1, the treating zone may be moved toward one face or the other, as desired. By using different fibers, with the same or different bonding agents, and in like or unlike amount, and with any kind of treating agent, a wide variety of products may be made.

It is to be understood that the number of chambers is not limited to two as described. Several interchamber spaces may be provided, in which different treating agents may be used, thus to form several treated interfacial layers.

Another variation in operation of the apparatus described is to use as the treating agent a bonding liquid of different character from that used in the adjacent layers. There are two well-known types of gravity deposited fiber mats now available commercially. One is bound primarily with starch, for dry uses, being subject to loss of bond when unduly wetted. The other is bound with synthetic resin resistant to water, as applied in an aqueous alkaline dispersion of a suitable phenol-formaldehyde condensation product. For example, the treating agent may be such a resin-forming liquid, where starch bond is provided in adjacent layers, to give the whole mat a waterproof reinforcing layer.

Figure 2:
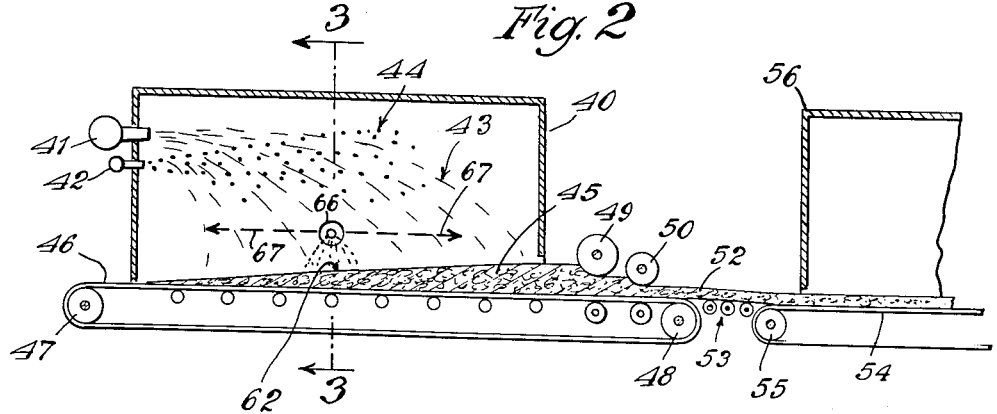
Fig. 2 represents a one-chamber process in which the forming top portion of an already formed portion of a mat is treated without interrupting the formation process.

However, variability in location of the treated zone of the mat may be effected in a single chamber, as shown in Fig. 2. A single chamber may be constructed, located and operated with reference to the moving conveyer, which is like either one of the chambers 20 and 21 of Fig. 1, or like the chamber shown in said Heino patent or in Brownlee U. S. No. 2,389,024, and additionally, such chamber may be modified for practice of the present invention by injecting the treating agent onto the mat being formed at any location as a band from edge to edge of the mat, while the fibers are still depositing in the zone being treated. In some respects this method of operation has advantages over the method shown in Fig. 1, because by increasing the width of the band treated as the mat still grows, the thickness of the treated layer may be increased, and by moving the position of the band along the chamber, the location of the treated layer in the mat may be varied.

Fig. 2 has a chamber 40 with a bank 41 of fiber nozzles, and where liquid adhesive is used, a bank 42 of adhesive spray nozzles, forming the conventional expanding streams 43 and 44, respectively. The falling fibers build up mat 45 on the moving conveyer 46 at the bottom of the chamber. Conveyer 46 runs over end roll 47 at the introductory end of the chamber, and over roll 48 beyond the discharge end. Two sets of compression rolls 49 and 50 are shown to densify the mat 45 in two stages to produce an unbonded felt 52 which is transferred by a suitable transfer mechanism 53 to a second endless conveyer 54 running over end roll 55, for passing the mat 52 into and through oven 56. In the oven, the adhesive is dried to bond the fibers in the case of liquid adhesive, or it is activated to adhesiveness in the case of thermoplastic or thermosetting solids. Also, the treating agent may be affected, as in the case of wax, to accomplish its function.

Figure 3:
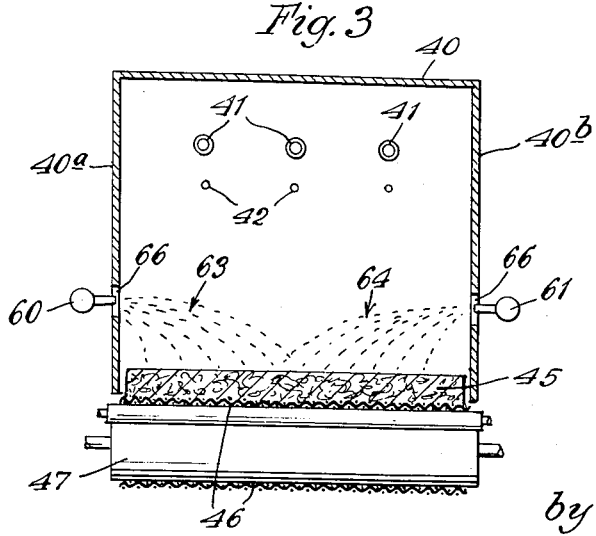
Fig. 3 is a vertical cross-section taken on line 3—3 of Fig. 2, showing an arrangement for the treating nozzles.

Associated with side walls 40a and 40b (Fig. 3) of the chamber 40, there are shown two nozzles 60 and 61 arranged to project the chosen treating agent onto the mat over a band 62 of chosen width and location (Fig. 2) by their respective controlled streams 63 and 64 (Fig. 3). The nozzles 60 and 61 are preferably located outside of the chamber 40 and discharge through holes 66 in the side walls, merely to prevent gathering of fibers on the nozzles, should they project into the chamber proper. The gathering of fibers, particularly when moist with adhesive, leads to the undesired formation of festoons, which may drop onto the mat and interfere with the desired uniformity of its formation. The dotted arrows 67 in Fig. 2 indicate that the position of the nozzle in each side wall may be moved in either direction from the location illustrated in the drawing. In so moving the two nozzles 60 and 61, the band 62 of treatment may be maintained at right angles to the direction of travel, whereby the location of the treated zone in the mat is uniform, or, if needed, the band 62 may be located on a bias, thus to create a mat with a treated layer slanting from one edge and one face to the opposite edge and opposite face.

An air-laid blanket formed by gravity deposition as described may be made with binder solids applied in liquid form in amount in the range from 5 to 15, and preferably from 8 to 10 parts by weight per 100 parts of dry fiber. For starch about 8 parts are used, dispersed in 94 parts of water per 6 parts of starch. To minimize the undesired weakening of a starch bond, an agent reactive with starch to insolubilize it in the drying process, may be used, such as dimethylol urea (see No. 2,450,377), monomethylol urea, urea-formaldehyde, melamine-formaldehyde, and potassium pyroantimoniate. Where dimethylol urea is used as such agent in the binder solids, it may vary from 0 to 20 parts to 100 to 80 parts of starch with wet-stability of the dried bond increasing as the usage of dimethylol urea increases.

*Example 1*

In the apparatus of Fig. 1, a deposit of sulfite fibers, moistened with adhesive as described, is formed to about 2½ inches depth, having a dry-weight density of about ½ lb. per cu. ft. This half-portion of the ultimate mat is slightly compressed to a level face of a mat about 1¼ inches thick. Onto this face is sprayed a wax emulsion to treat the fibers. Paraffin wax emulsified with triethanolamine oleate to about 46% solids is used in amount to apply about 5½ pounds of wax to 1000 sq. ft. of the mat. Then the mat moves into the second chamber wherein the second half-portion is deposited on the wax-treated fibers to a total height of about 4½ inches. The resulting unbonded mat is then compressed to approximately 1 inch thickness and passed through a drying oven at 240° F. The drying sets the bond and melts the wax to wax-size the carrying fibers. Then the mat may be flexibilized if desired by slight dry compression to about ⅝ inch thickness and a density of about 2 lbs. per cu. ft. Such a flexible mat is suitable for sanitary napkins.

Powdered wax, liquid synthetic resin, powdered thermosetting resin, lacquer, and numerous materials may be applied to alter the treated fibers, and these and other modifications are contemplated as falling within the scope of the invention set forth in the appended claims.

I claim:
1. The method of making a fiber felt comprising depositing fibers and bonding agent from air suspension in the form of a low-density open and porous unbonded mat subject to subsequent densification by compression, applying an additive in finely divided form to the topmost fibers on at least a portion of the exposed top of said mat whereby to change the surface characteristics of said fibers and to leave openings between the altered fibers, depositing additional substantially individualized fibers and bonding agent to form a mat on top of said first deposited low density mat whereby the additional deposited fibers mesh into the said openings of said first deposited mat for integrally felting the two mats together, densifying the interfelted unbonded mats to a higher degree of felting, and setting the bonding agent to maintain the felting.

2. The method of making a fiber felt comprising depositing fibers and bonding agent from air suspension in the form of a low-density open and porous unbonded mat subject to subsequent densification by compression, applying to the topmost fibers on at least a portion of the exposed top of said mat finely divided water-resistant material which is effective in the final felt to lessen the absorptive character of the so-treated fibers relative to adjacent untreated fibers, the quantity of said added material being limited to leave openings between the resulting altered fibers, depositing additional substantially individualized fibers and bonding agent to form a mat on top of said first deposited low-density mat whereby the additional deposited fibers mesh into the said openings of said first deposited mat for integrally felting the two mats together, densifying the interfelted unbonded mats to a higher degree of felting, and setting the bonding agent to maintain the felting.

3. The method of making a fiber felt comprising depositing fibers and a liquid containing a bonding agent from air suspension in the form of a low-density open and porous unbonded mat subject to subsequent densification by compression, applying to the topmost fibers on at least a portion of the exposed top of said mat a liquid providing a finely divided water-resistant material which is effective in the final felt to lessen the absorptive character of the so-treated fibers relative to adjacent untreated fibers, the quantity of added material being limited to leave openings between the resulting altered fibers, depositing additional substantially individualized fibers and bonding agent to form a mat on top of said first deposited low density mat whereby the additional deposited fibers mesh into the said openings of said first deposited mat for integrally felting the two mats together, densifying the interfelted unbonded mats to a higher degree of felting, and setting the bonding agent to maintain the felting.

4. The method of making a fiber felt comprising depositing fibers and bonding agent from air suspension in the form of a low-density open and porous unbonded mat subject to subsequent densification by compression, applying to the topmost fibers on at least a portion of the exposed top of said mat a finely divided form of a water-resistant wax effective in the final felt to lessen the absorptive character of the so treated fibers relative to adjacent untreated fibers, the quantity of added material being limited to leave openings between the resulting altered fibers, depositing additional substantially individualized fibers and bonding agent to form a mat on top of said first deposited low-density mat whereby the additional deposited fibers mesh into the said openings of said first deposited mat for integrally felting the two of said first deposited mat for integrally felting the two mats together, densifying the interfelted unbonded mats to a higher degree of felting, and setting the bonding agent to maintain the felting.

5. The method of making a fiber felt comprising depositing fibers and an aqueous liquid containing a bonding agent from air suspension in the form of a low-density open and porous unbonded mat subject to subsequent densification by compression, applying to the topmost fibers on at least a portion of the exposed top of said mat a finely divided aqueous wax emulsion, the quantity of said added emulsion being limited to leave openings between the resulting altered fibers, depositing additional substantially individualized fibers and bonding agent to form a mat on top of said first deposited low-density mat whereby the additional deposited fibers mesh into the said openings of said first deposited mat for integrally felting the two mats together, densifying the interfelted unbonded mats to a higher degree of felting, and drying the said mat at a temperature to melt the wax and set the bond, whereby the wax is effective in the resulting bonded felt to lessen the absorptive character of the so-treated fibers relative to adjacent untreated fibers.

6. The method of making a fiber felt comprising depositing fibers and an aqueous liquid containing a hydrophilic bonding agent from air suspension in the form of a low-density open and porous unbonded mat subject to subsequent densification by compression, applying to the topmost fibers on at least a portion of the exposed top of said mat a finely divided aqueous wax emulsion, the quantity of said added emulsion being limited to leave openings between the resulting altered fibers, depositing additional substantially individualized fibers and liquid to form a mat on top of said first deposited low-density mat whereby the additional deposited fibers mesh into the said openings of said first deposited mat for integrally felting the two mats together, densifying the interfelted unbonded mats to a higher degree of felting, and drying the said mat at a temperature to melt the wax and set the bond, whereby the wax is effective in the resulting bonded felt to lessen the absorptive character of the so treated fibers relative to the adjacent fibers bonded with said hydrophilic bond.

7. The method of making a fiber felt comprising depositing fibers and a heat-setting bonding agent from air suspension in the form of a low-density open and porous unbonded mat subject to subsequent densification by compression, applying to the topmost fibers on at least a portion of the exposed top of said mat a finely divided aqueous wax emulsion, the quantity of said added emulsion being limited to leave openings between the resulting altered fibers, depositing additional substantially individualized fibers and a heat-setting bonding agent to form a mat on top of said first deposited low-density mat whereby the additional deposited fibers mesh into the said openings of said first deposited mat for integrally felting the two mats together, densifying the interfelted unbonded mats to a higher degree of felting, and heating the resulting mat at a temperature to melt the wax and set the bond, whereby the so-treated fibers are characteristically different from the adjacent bonded fibers.

8. The method of making a fiber felt comprising depositing fibers and bonding agent from air suspension in the form of a low-density open and porous unbonded mat subject to subsequent densification by compression, applying to the topmost fibers on at least a portion of the exposed top of said mat a finely divided material effective in the final mat to change the surface characteristics of said fibers, the quantity of said added material being limited to leave openings between the resulting altered fibers, depositing additional substantially individualized fibers and bonding agent to form a mat on top of said first deposited low density mat whereby the additional deposited fibers mesh into the said openings of said first deposited mat for integrally felting the two mats together, densifying the interfelted unbonded mats to a higher degree of felting, and setting the bonding agent to maintain the felting.

9. The method of forming an integrally felted bonded air-laid fiber mat which comprises forming a first mat portion of unbonded air-laid fibers at a density subject to increased felting upon densification, applying finely divided material to the fibers at the exposed face of said mat to modify the surface character of the fibers without substantial loss of the interfiber voids thereof, forming on said face a second mat portion of unbonded air-laid fibers at a density subject to increased felting upon densification, said second portion being formed with mutual penetration of the interfacial fibers of each mat portion into the inter-fiber voids of the other mat portion, densifying the joined portions facewise whereby to increase the interfelting within each portion and between each portion, and bonding the fibers at the felting of said densification.

10. The method of forming an integrally felted bonded air-laid fiber mat which comprises forming a first mat portion of unbonded air-laid fibers at a density subject to increased felting upon densification, applying finely divided liquid containing fiber-modifying material to the fibers of the exposed face of said mat without substantial loss of the inter-fiber voids thereof, forming on said face a second mat portion of unbonded air-laid fibers at a density subject to increased felting upon densification, said second portion being formed with mutual penetration of the interfacial fibers of each mat portion into the interfiber voids of the other mat portion, densifying the joined portions facewise whereby to increase the interfelting within each portion and between each portion, and bonding the fibers at the felting of said densification.

11. The method of forming an integrally felted bonded air-laid fiber mat which comprises forming a first mat portion of unbonded air-laid fibers at a density subject to increased felting upon densification, applying in finely divided form a liquid containing water-proofing wax to the fibers of the exposed face of said mat without substantial loss of the interfiber voids thereof, forming on said face a second mat portion of unbonded air-laid fibers at a density subject to increased felting upon densification, said second portion being formed with mutual penetration of the interfacial fibers of each mat portion into the inter-fiber voids of the other mat portion, densifying the joined portions facewise whereby to increase the interfelting within each portion and between each portion, and bonding the fibers at the felting of said densification.

References Cited in the file of this patent

UNITED STATES PATENTS

| | | |
|---|---|---|
| 1,645,858 | Hayes | Oct. 18, 1927 |
| 2,086,757 | Williams | July 13, 1937 |
| 2,155,875 | Stemper | Apr. 25, 1939 |
| 2,164,499 | Coughlin | July 4, 1939 |
| 2,188,373 | Pearce | Jan. 30, 1940 |
| 2,288,095 | Lindsay et al. | June 30, 1942 |
| 2,341,130 | Unsworth | Feb. 8, 1944 |
| 2,382,290 | Callander | Aug. 14, 1945 |
| 2,483,404 | Francis | Oct. 4, 1949 |
| 2,543,101 | Francis | Feb. 27, 1951 |
| 2,569,765 | Kellett et al. | Oct. 2, 1951 |
| 2,577,205 | Meyer et al. | Dec. 4, 1951 |
| 2,581,069 | Bertolet | Jan. 1, 1952 |
| 2,698,271 | Clark | Dec. 28, 1954 |